Jan. 3, 1939.    J. M. MAJEWSKI, JR    2,142,975
FRUIT JUICE EXTRACTOR
Filed July 16, 1937
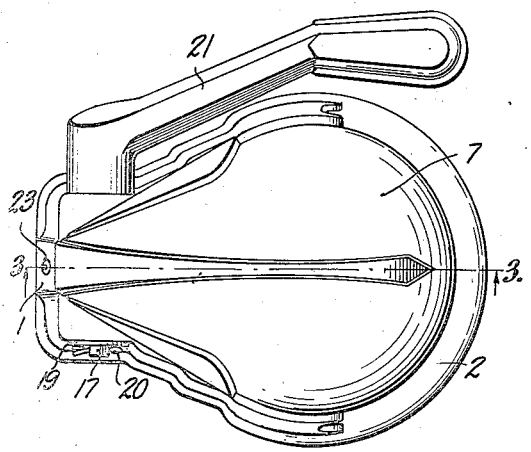
Fig. 1.
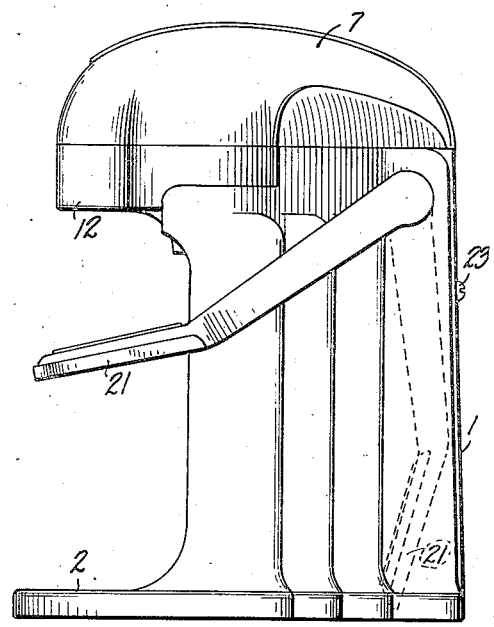
Fig. 2.
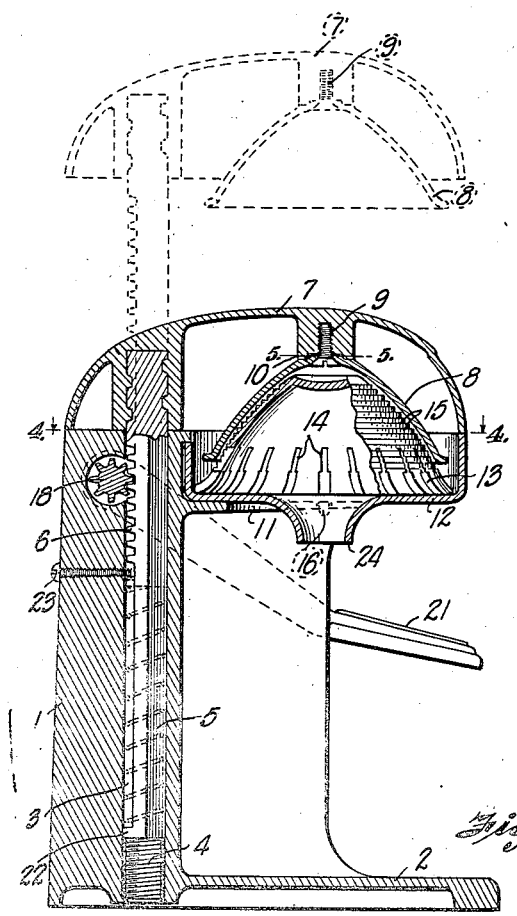
Fig. 3.
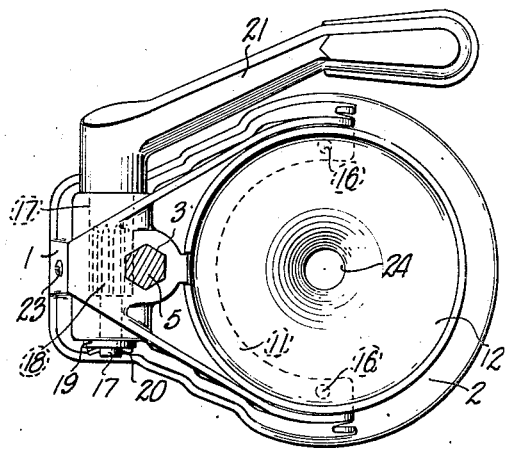
Fig. 4.
Fig. 5.
INVENTOR
Joseph M. Majewski Jr.
BY
ATTORNEY Patented Jan. 3, 1939

2,142,975

UNITED STATES PATENT OFFICE 2,142,975

FRUIT JUICE EXTRACTOR

Joseph M. Majewski, Jr., Kansas City, Mo., assignor to Foster L. Talge, doing business as Rival Manufacturing Company, Kansas City, Mo.

Application July 16, 1937, Serial No. 153,981

2 Claims. (Cl. 100—42)

My invention relates to fruit juice extractors, and more particularly to fruit juice extractors adapted to be used in the home, soda fountains, bars and the like, for extracting juice from citrus fruit.

One object of my invention is to provide a fruit juice extractor adapted to extract substantially all of the juice from citrus fruits, such as oranges or lemons, and deliver strained, potable juice free of seeds, in a rapid and expeditious manner.

Another object of my invention is to provide a fruit juice extractor of the type in which the juice is expressed from the fruit by means of a reciprocating pressing member having means for bringing the pressing member rapidly into engagement with the fruit.

Other and further objects of my invention will appear from the following description.

In the accompanying drawing which forms part of the instant specification and which is to be read in conjunction therewith, and in which like reference numerals are used to indicate like parts in the various views, Fig. 1 is a top plan view of a fruit juice extractor showing one embodiment of my invention.

Fig. 2 is a side elevation of the fruit juice extractor shown in Fig. 1.

Fig. 3 is a sectional view taken along the line 3—3, Fig. 1.

Fig. 4 is a sectional view taken along the line 4—4, Fig. 3.

Fig. 5 is a sectional view taken along the line 5—5, Fig. 3.

In general, my invention contemplates the provision of a pressing member in the form of a cup adapted to coact with a straining member, against which the fruit is to be pressed, of similar form. The pressing member is carried by a rack adapted to reciprocate in a standard which carries the straining member. A pinion operated by a lever engages the rack, the arrangement being such that the lever and the pinion and rack produce sufficient mechanical advantage to exert sufficient pressing force to express substantially all of the juice from a half of a citrus fruit, as for example, an orange. The rack is formed only on the upper portion of the reciprocating member, the lower portion thereof being formed free of teeth. Spring means are provided for urging the reciprocating member which carries the upper pressing member to its uppermost position, as shown in dotted line in Fig. 3.

More particularly, referring now to the drawing, a standard 1 is provided with a base 2. The standard and base may be of any suitable configuration, preferably in the shape of an ornamental design. The standard is provided with a vertical bore 3 adapted to house a spring 4 and a reciprocating member 5. The upper portion of the reciprocating member is provided with rack teeth 6 and carries a bracket-like member 7 to which the upper presser member 8 is secured by means of a screw 9. The socket for the upper pressing member is made hexagonal in shape as is the upper portion 10 of the member 8. This prevents relative rotation of the pressing member 8 and the bracket member 7, reducing the tendency of the screw 9 to become loose during operation. The standard 1 is also provided with a U-shaped bracket 11, adapted to support a juice receiving cup 12. The juice receiving cup 12 in turn supports the combined male pressing member and the strainer 13, which is provided with straining slots 14 and a plurality of annular steps 15. The juice receiving cup 12 is provided with lugs 16 adapted to fit in corresponding holes formed in the bracket 11.

Journaled in standard 1 transversely thereof is a shaft 17 having an end thereof formed with or carrying secured thereto, a pinion 18 adapted to engage the rack teeth 6. The shaft 17 is secured in the standard by means of a washer 19 and a cotter pin 20. Secured to the shaft is an operating lever 21 adapted to rotate the shaft and hence the pinion 18.

The lower end of the reciprocating member 5 is formed with a lug 22. A screw 23 extends through the standard 1 and projects into the vertical bore 3 a sufficient distance to engage the lug 22. The juice receiving member 12 is provided with a juice drainage spout 24 under which a receptacle such as a glass is adapted to be positioned to receive the strained expressed juice.

As the operating lever 21 is lifted the reciprocating member will be forced to move upwardly under the influence of the action of the pinion 18 upon the rack 6. When the bottommost tooth of the rack leaves the pinion, the spring 14 will cause the reciprocating member to move upwardly in the position shown in Fig. 3. The pinion being disengaged from the rack will rotate freely, and the weight of the operating member 21 is such that it will assume the dotted line position shown in Fig. 2.

With the parts in the dotted line position, that is, with the female pressing member 8 in the position shown in Fig. 3, and the operating lever 21 shown in the position of Fig. 2, the fruit juice extractor is in position to receive fruit from which the juice is to be expressed.

A piece of citrus fruit such as, for example, an orange, is cut in half and a half fruit with the cut side downwardly is placed over the combined male pressing member and strainer. The operator then presses upon bracket 7 and moves it carrying the female pressing member 8 downwardly against the action of the spring 4. Slightly before the female pressing member 8 engages the rind of the fruit to be pressed the bottom-most rack tooth will engage a tooth of the pinion 18. The operating lever 21 will rotate counter-clockwise, as viewed in Fig. 2. The downward motion of the reciprocating member 5 is continued against the action of the spring until the female pressing member 8 engages the rind of the fruit to be pressed. At this time the operator will grasp the operating lever 21 with the disengaged hand and continue the counter-clockwise rotation thereof, forcing the reciprocating member 5 downwardly through the mechanical advantage of the leverage of the operating handle, and the mechanical advantage of the rack and pinion. The bringing of the pressing members 8 and 13 together squeezes the fruit, expressing the juice therefrom. The expressed juice will flow by gravity into the juice receiving cup 12 through the straining slots 14 and out of the juice funnel 24 into such juice receptacle as is provided. After the juice has been expressed from the fruit the operating handle is operated clockwise, as viewed in Fig. 2, raising the reciprocating member 5 and its associated bracket 7 and pressing member 8. This movement is continued until the bottom-most tooth of the rack disengages the pinion, after which the spring 4 continues the upward movement. The rind may be then readily removed and the operation repeated.

After the device has been used to express the juice from several pieces of fruit the juice receiving cup will contain considerable seeds, heavy pieces of pulp and the like. The juice receiving member 12 can be readily removed together with the combined straining and pressing member 13 and readily cleaned.

It will be observed that I have accomplished the objects of my invention. I have provided a simple juice extracting device which will rapidly express juice from citrus fruit in strained condition. The device admits of easy sanitation and cleaning, and is compact so that it may be easily stored in a cupboard at the home or occupy small space on a soda fountain or bar.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a fruit juice extractor, a base having a standard, a bore in said standard, a rack positioned in said bore for reciprocation therein, a pinion journaled in said standard having teeth engaging said rack, an operating lever for said pinion to reciprocate said rack, said standard formed with a substantially semi-circular flange, a juice receiving cup adapted to rest upon said flange, said standard being formed with a lug projecting above said flange and toward said juice receiving cup, said cup and said flange being formed with co-operating means adapted to position said cup upon said flange in a predetermined position, means formed upon said cup for co-action with said lug when said cup is in said predetermined position for removably positioning said cup upon said flange, and co-acting pressing members supported by said cup and said rack respectively, for expressing juice from fruit positioned therebetween.

2. In a fruit juice extractor, a standard, said standard being formed with a substantially semi-circular flange adjacent the upper end thereof, a juice receiving cup adapted to be positioned on said flange, said cup and said flange being formed with co-operating means adapted to locate said cup in a predetermined position, said means including a projection on one member, said projection co-acting with the flange and juice receiving member to maintain the juice-receiving member in predetermined relation with said flange, a pair of co-operating pressing members, one of said pressing members being positioned in said cup, and means for operating the other of said pressing members to express juice from fruit placed therebetween.

JOSEPH M. MAJEWSKI, Jr.